UNITED STATES PATENT OFFICE.

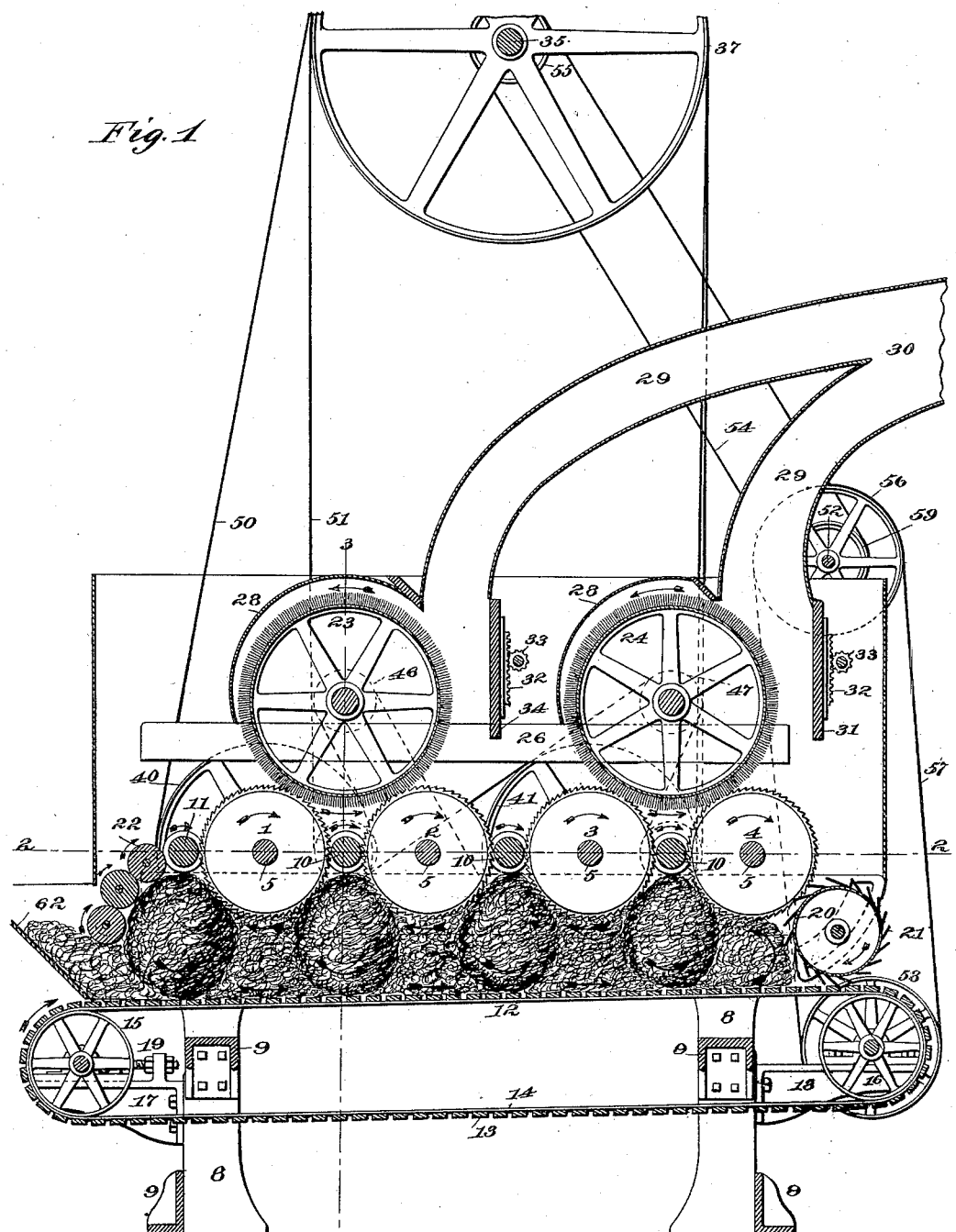

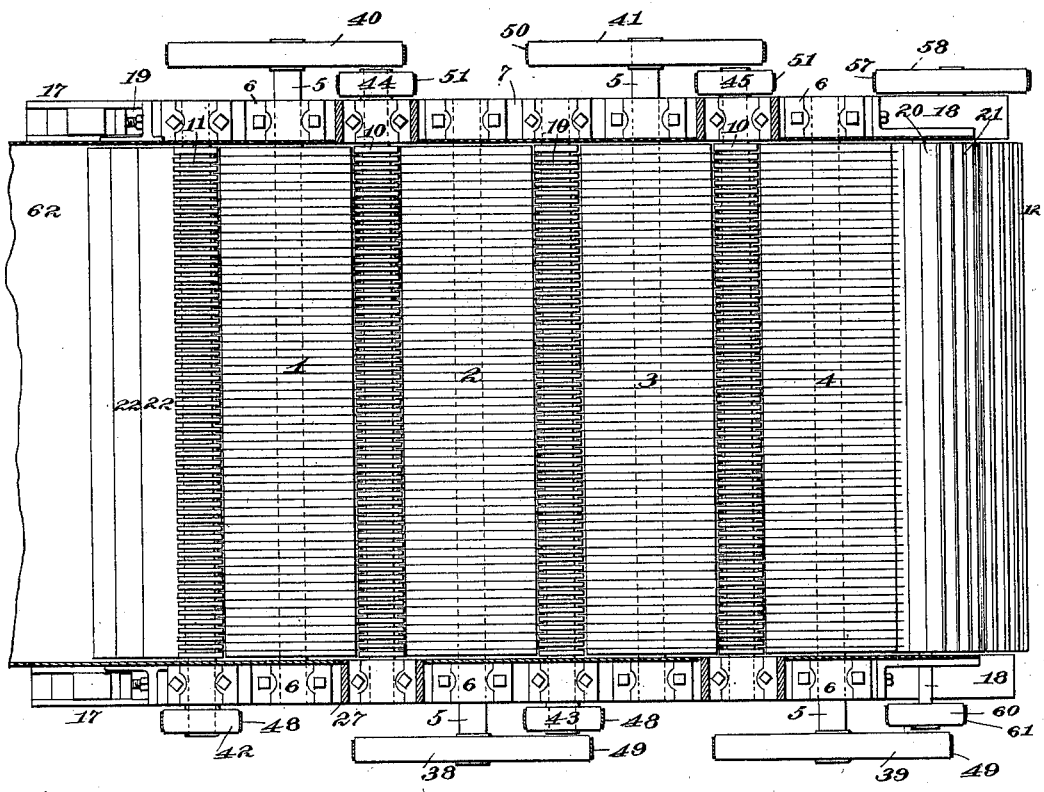

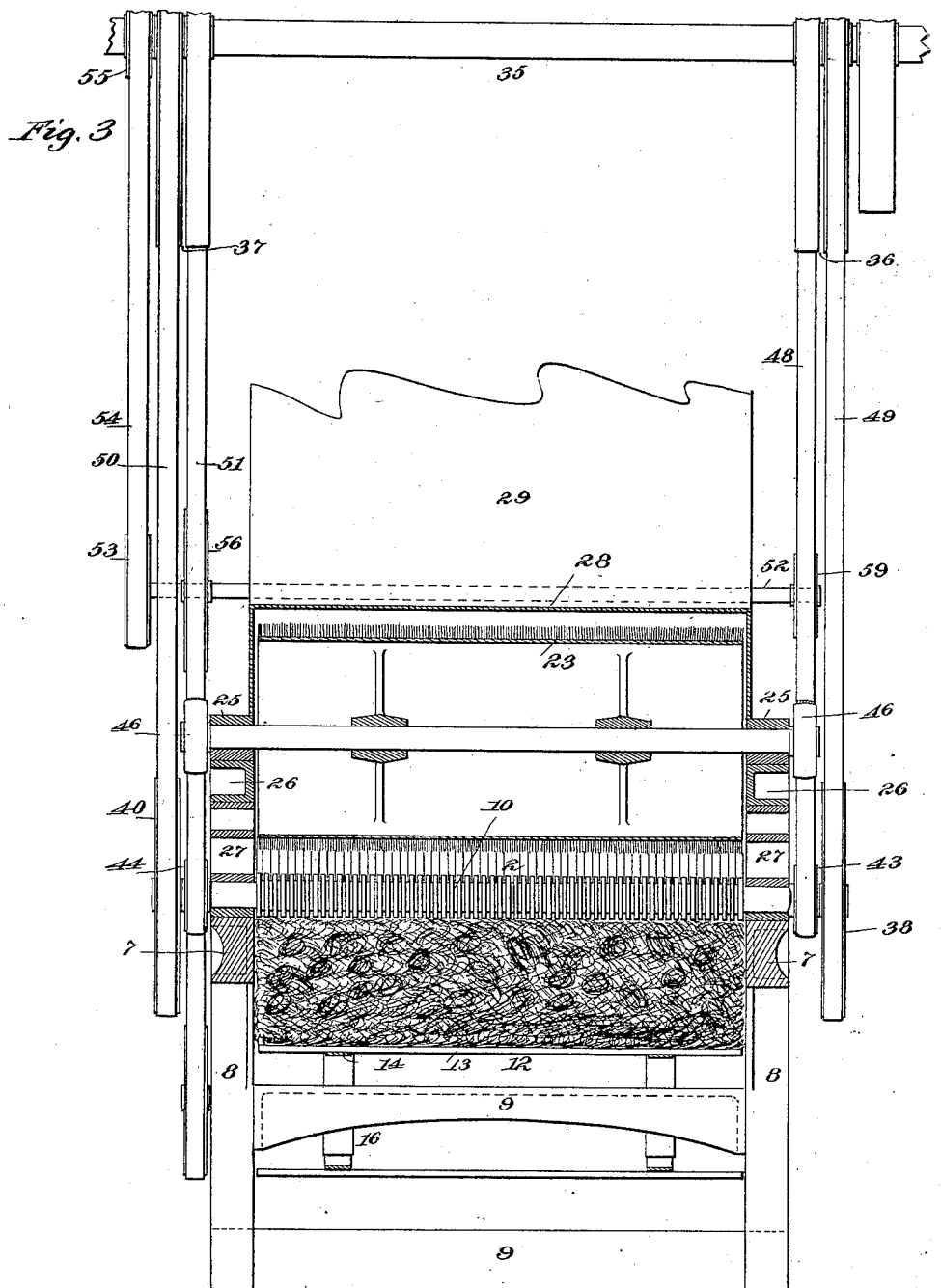

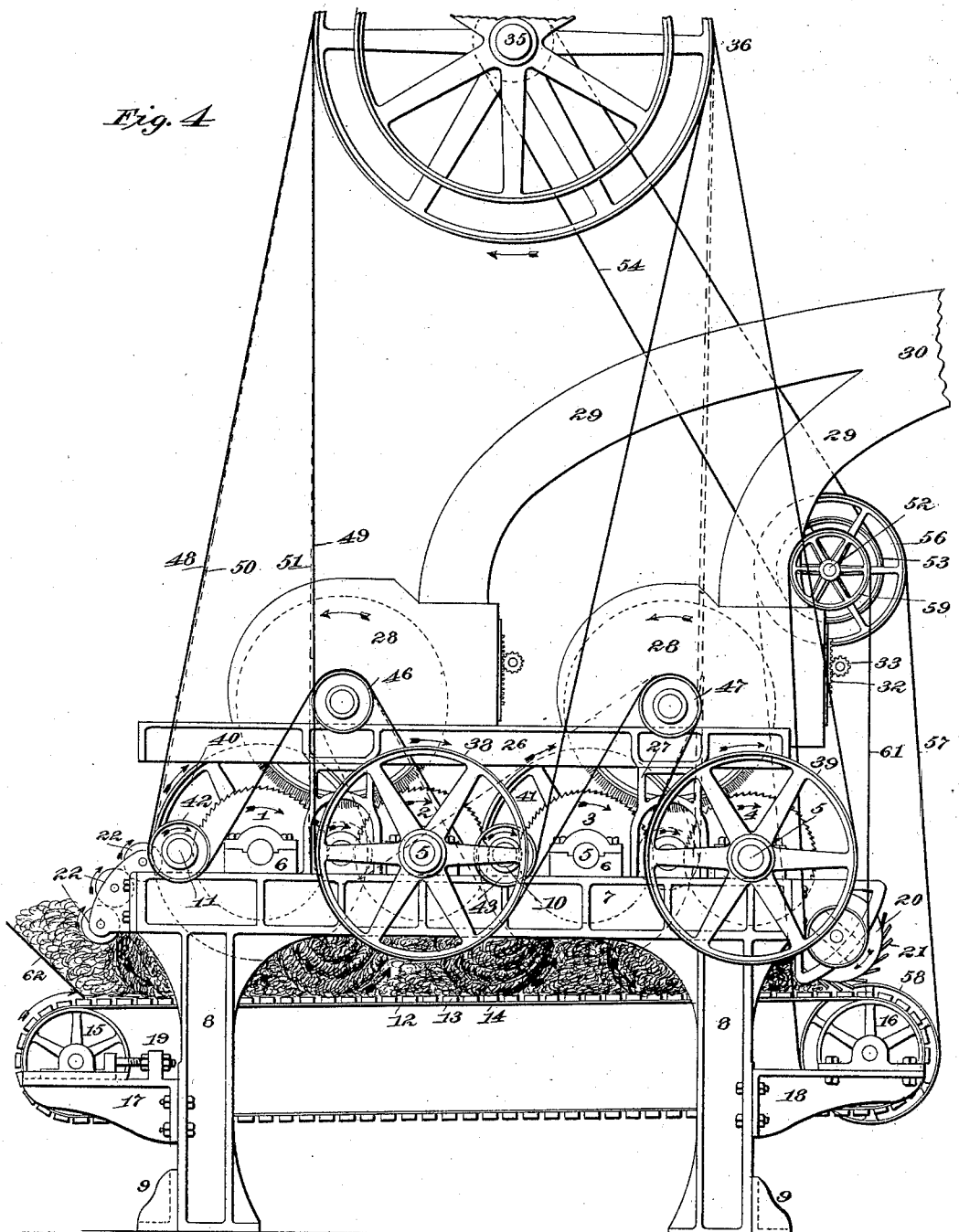

MAGNUS SWENSON, OF CHICAGO, ILLINOIS, ASSIGNOR TO THE AMERICAN COTTON COMPANY, OF NEW YORK, N. Y.

COTTON-GIN.

SPECIFICATION forming part of Letters Patent No. 608,729, dated August 9, 1898.

Application filed June 11, 1897. Serial No. 640,375. (No model.)

*To all whom it may concern:*

Be it known that I, MAGNUS SWENSON, a citizen of the United States, residing at Chicago, in the county of Cook and State of Illinois, have invented certain new and useful Improvements in Cotton-Gins; and I do hereby declare the following to be a full, clear, and exact description of the invention, which will enable others skilled in the art to which it appertains to make and use the same.

My invention relates to various new and useful improvements in cotton-gins of that type wherein a plurality of gangs of saws are employed.

The objects of the invention are to simplify the construction and improve the operation of cotton-gins of that type.

The invention consists, first, in arranging a plurality of gangs of saws approximately in the same preferably horizontal plane, with a feeding apron or belt operating at a suitable distance from the saws and in substantially the same parallel plane, whereby an entirely novel method of operation takes place, as will be explained; second, in interposing between the adjacent gangs of saws of a multiple cotton-gin a grooved roller rotating in the same direction as the saws and with the grooves of which both adjacent gangs of saws coöperate; third, in providing a feeding belt or apron for preferably a multiple gin, by which foreign substances and seeds can be separated to a large extent during the ginning operation; fourth, in combining with a feeding belt or apron a suitably-arranged roller for preventing the cotton from being carried out of the gin with the belt, said roller preferably coöperating with one of the gangs of saws rotating in the same direction and being preferably spiked or corrugated, so as not to obstruct the passage of seed and foreign substances removed by the belt; fifth, in arranging with a gin employing a gang of saws and a grooved roller with which said saws coöperate a feed-roller also coöperating with said grooved roller and rotating in the same direction for keeping the grooved roller free of cotton, and, sixth, in so arranging the brushes of a multiple cotton-gin and the discharge thereof as to allow for effective moting by all of the brushes, which result, so far as I know, has never before been obtained in a multiple gin employing a plurality of brushes.

The features of novelty referred to are susceptible of use in different and independent structures; but I prefer to embody them in a single structure, which I will describe and which is illustrated in the accompanying drawings, to which attention is directed.

In the drawings, Figure 1 is a longitudinal sectional view of a multiple gin embodying all the features of novelty referred to; Fig. 2, a section on the line 2 2 of Fig. 1; Fig. 3, a section on the line 3 3 of Fig. 1, and Fig. 4 a side elevation with the sides removed.

In all of the above views the same parts are represented by the same reference-numerals.

The gin illustrated in the drawings is provided with four gangs or series of saws, (designated 1, 2, 3, and 4.) A greater or lesser number of saws may be used; but I prefer to employ an even number of gangs of saws in order that a single brush may be used with each pair.

I show the saws mounted on shafts 5, which are carried in journals 6 in the side frames 7. Preferably the saws are mounted in the same horizontal plane, as thereby I am enabled to more effectively gin and clean the cotton. The side frames 7 are provided with downwardly-extending legs 8 and with suitable cross-frames 9 9, so as to constitute a sufficiently rigid framework for the gin. The sides are inclosed in any suitable way.

Mounted between each of the pairs of saws 1 and 2, 2 and 3, and 3 and 4 is a roller 10, having grooves therein into which the saws enter, as shown. The said grooves are slightly wider than the saws, in order to enable the cotton removed by the saws to pass through said groove. At the other side of the gang of saws 1 is a similar roller 11, with which the said saws coöperate in the same way.

The rollers 10 and 11 in my improved gin take the place of ordinary slats, and as they revolve in the same direction as the saws they are kept clean of cotton, so that with my improved gin there is no possibility of "choking."

It will be observed that while the saws 1, 2, and 3 each coöperate with two of the grooved rollers referred to the ginning takes place only between the coöperation of the saws and a single roller for each of them. In other words, the grooved roller 11 actively coöperates with the saws 1 to effect the ginning, the roller 10 at the left of the saws 2 coöperates with those saws for the same purpose, the roller at the left of the saws 3 coöperates with those saws, and the roller at the left of the saws 4 coöperates with those saws.

The advantage of extending the saws 1, 2, and 3 into coöperation with the grooved rollers at the other side thereof, as shown, is to keep the rollers always free of cotton, as will be understood.

I am aware that prior to my invention the employment of a grooved roller coöperating with a gang of saws had been suggested, said roller being used in lieu of the ordinary slats; but I am not aware that any one prior to my invention had made use of these grooved rollers in a multiple gin and engaged each of said rollers with a plurality of gangs of saws for the purpose mentioned.

In order to feed the cotton to the saws, I make use of an endless conveying-belt 12, composed, preferably, of a series of slats 13, carried on leather or chain belts 14 and mounted on the rollers 15 and 16. The said rollers are carried in brackets 17 and 18, secured to the framework, and the roller 15 may be provided with an adjusting device 19 for keeping the feeding-belt under the proper tension.

When a slatted feed-belt, as described, is used, the slats are placed sufficiently far apart to allow for the passage of the seed through the same. If desired, the belt 14 may be of a width equal to that of the gin, so that the spaces between the slats will constitute pockets for the reception of the seed and foreign substances removed from the cotton during the ginning operation and which will be carried off with the belt instead of passing through the same. The upper face of the feed-belt is arranged substantially parallel to the saws and a sufficient distance beneath the same to allow for the requisite amount of cotton between the saws and the belt.

In a gin employing four saws of the usual size the feed-belt is preferably located from four to six inches beneath the lower edges of the saws. The spaces formed between the saws and the belt constitutes a ginning-chamber, in which an essentially-novel method of operation takes place, as will be presently described.

In order to prevent the cotton within the ginning-chamber from being carried out with the feed-belt, I make use of a roller 20, located immediately behind the saws 4, and preferably this roller is provided on its periphery with a series of points or spikes 21, arranged tangentially thereon and working in close proximity to the feed-belt and overlapping the saws 4. This roller 20 is driven in the direction indicated by the arrow—namely, in the same direction as the saws 4.

To prevent cotton from being carried up with and accumulated on the end grooved roller 11, I provide one or more smooth-faced rollers 22, working in close relation thereto and rotating in the same direction, as shown, so that any cotton which may tend to be carried up by the roller 11 will be immediately swept off of the same by the roller 22, adjacent to the same. When more than one roller 22 are used, these rollers are mounted relatively to each other, as shown.

In order to remove the cotton from the saws, any suitable and appropriate mechanism may be employed, such as a brush. I prefer, however, to use relatively large brushes, each coöperating with two gangs of saws, so that in the case of four gangs of saws, as explained, two brushes 23 and 24 will be used. These brushes are mounted in appropriate journals 25, bolted to side frames 26, which are in turn bolted to extensions 27 on the side frames 7. Each brush is partially surrounded by a hood 28 in the usual way and coöperates with a lint-flue 29, two of said flues being used and merging together into a single flue 30.

In order to provide for the proper "moting" in the gin, by which is meant the removal from the ginned cotton of the small particles of crushed seed, dirt, and other foreign substances found therein, I arrange in appropriate proximity to the brush 24 an adjustable plate 31, having suitable means for adjusting the same, such as a rack 32 and pinion 33. The use of such an adjustable plate coöperating with a brush is well known in the art, and by adjusting the plate to the proper position the motes from the cotton will pass beneath the same and out of the machine.

In the case of a multiple gin one of the great difficulties which has heretofore been experienced is the proper moting by the brush or brushes that are located interiorly of the machine—such, for example, in the present case as the brush 23. I provide for the moting by that brush or any other brush or brushes in a multiple cotton-gin that may be located interiorly by making use therewith of an adjustable plate 34, arranged in identically the same way as the plate 31, and instead of throwing the motes out of the machine directly by means of the brush 23 I cause the motes to be projected beneath the plate 34 onto the brush 24 and to be carried by the latter brush and expelled, as I have before explained. It will be seen in this way that any number of brushes may be used, one of which serves not only to project from the gin the motes which may be in the cotton removed thereby from the saws, but also to receive the motes from the other brush or brushes and project them from the machine.

When more than two brushes are employed, precisely the same action takes place, the first brush impelling the motes separately from the cotton ginned thereby onto the second brush, which forces these motes, together with the motes separated from the cotton ginned thereby, onto the third brush, by which the motes from the first and second brushes, together with the motes removed from the cotton ginned by the third brush, will be impelled out of the machine.

The various elements of the gin rotate in the directions indicated by the arrows and at the proper speeds. All of the saws preferably rotate at the same speed. All of the grooved rollers 10 and 11 preferably rotate at the same peripheral speed as the saws. The brushes 23 24 rotate at a very much higher speed than the saws. The feeding-belt is moved comparatively slowly, as is also the roller 20. The smooth roller or rollers 22 preferably rotate at the same speed as the grooved roller 11. Any suitable or appropriate mechanism may be employed for operating these elements, and in the drawings I illustrate a convenient arrangement of driving-belts for this purpose.

Mounted above the gin is a suitable counter-shaft 35, carrying two fast pulleys 36 and 37, located over the sides of the gin. Coöperating with each of the pulleys 36 and 37 are two main driving-belts, the belts which coöperate with the pulley 36 being indicated by full lines and those which coöperate with the pulley 37 being indicated by dotted lines.

Mounted upon the shafts of the saws 24 at one side of the machine are pulleys 38 and 39. Corresponding pulleys 40 and 41 (shown in dotted lines, Fig. 4) are mounted on the shafts of the saws 1 and 3 at the other side of the gin. The grooved rollers 10 and 11 are driven by pulleys 42 and 43 at one side and by pulleys 44 and 45 (in dotted lines) at the other side of the gin. The brushes 23 and 24 are driven from both sides of the gin by means of pulleys 46 and 47. As stated, two driving-belts coöperate with each of the pulleys 36 and 37 when used. One of these belts 48 passes around the pulley 42 for the grooved roller 11, thence over the pulley 46 for the brush 23 at the same side of the machine, thence under the pulley 43 of the grooved roller between the saws 2 and 3, and thence upward over the driving-pulley. The other driving-belt 49 at the same side of the machine passes around the pulley 38 for the saws 2, thence over the pulley 47 at the same side of the machine for the brush 24, thence around the pulley 39 for the saws 4, and thence up to the driving-pulley. At the other side of the machine one of the belts 50 (shown in dotted lines) passes around the pulley 40 for the saws 1, thence over the pulley 46 of the brush 23 at that side of the machine, and thence around the pulley 41 for the saws 3 to the driving-pulley 37. The last-mentioned driving-belt 51 (also shown in dotted lines) passes under the pulley 44 for the grooved roller between the saws 1 and 2, thence over the pulley 47 for the brush 24 at that side of the machine, thence under the pulley 45 for the grooved roller between the saws 3 and 4, and thence to the driving-pulley 37. By this arrangement I provide on each side of the machine a driving-belt for driving two of the gangs of saws and two of the grooved rollers and at the same time drive each brush by means of two belts, so that at the high speed at which the brushes require to be rotated there can be but slight slipping thereof.

In order to drive the feed-belt and the roller 20, I provide a counter-shaft 52, mounted above the rear end of the gin and carrying a pulley 53, driven by a belt 54 from a small pulley 55, connected to the shaft 35. Mounted on the shaft 52 is a pulley 56, over which a belt 57 runs to a pulley 58 on the shaft of the roller 16. The shaft 53 carries a third pulley 59, which drives a pulley 60 on the shaft of the roller 20 by means of the belt 61.

I do not show in the drawings any mechanism for driving the rollers 22, but any appropriate mechanism for that purpose may be used.

The operation is as follows, the parts being driven in the directions indicated and at the proper relative speeds: The seed-cotton is fed onto the feeding-belt 12, such as through a chute 62, and is carried by the belt toward the roller 20. The teeth on the said roller will, however, constantly tend to sweep the cotton back into the ginning-chamber and prevent it from passing out with the belt. The rotation of the saws 4 with respect to the roller 20 will prevent cotton from being carried up with said roller out of the gin. As soon as a sufficient amount of cotton has accumulated on the feed-belt to fill the ginning-chamber or to come in contact with the saws its fiber will be removed by means of the saws and carried up thereby through the grooves in the grooved rollers. The brushes 23 and 24 will remove the cotton from the saws in the usual way and propel it by the draft through the lint-flues 29. No cotton can pass around or accumulate upon the grooved rollers 10, for the reason that the saws at the left of each of said rollers tend at all times to remove cotton from the same.

During the ginning operation the cotton in the ginning-chamber partakes of two well-defined and clearly-observable movements. Immediately beneath each of the grooved rollers the cotton assumes the form of a roll, as in an ordinary gin, being touched upon by the two adjacent gangs of saws and rapidly rotated thereby and by the movement of the belt.

In Fig. 1 of the drawings I illustrate the four rolls of seed-cotton which are formed in the ginning-chamber, as I have explained. In addition to the cotton forming in a roll beneath each of the grooved rollers, and thereby presenting new surfaces constantly to the teeth of the saws, the cotton partakes of a general but much slower movement back and forth in the ginning-chamber, so that it is kept constantly in motion. In Fig. 1 I have indicated by arrows the general movement of the entire bulk of cotton to which reference has been made.

Not only do the two movements of the cotton which take place in the ginning-chamber result in the constant presentation to the teeth of the saws of its different portions, but by keeping the cotton constantly in agitation a very large proportion of foreign substances therein will be shaken out, and if the belt be slatted will pass by gravity through the belt, or if the belt be provided with pockets therein will be carried by said pockets out of the gin. The same is true of the seeds from which the cotton has been removed and which are either thrown through the belt or will be removed by the belt out of the gin. It will be observed that the roller 20, owing to its arrangement and construction, will not obstruct the passage of seeds and foreign substances carried away by the belt.

So far as the moting effect is concerned it is believed that it has been sufficiently described, the brush 24 throwing out the motes beneath the plate 31 from the cotton removed from the saws 3 and 4 in the usual way, while the brush 23 throws out the motes from the cotton removed from the saws 1 and 2 onto the brush 24, and those motes are carried by the brush 24 and thrown out thereby beneath the plate 31.

As stated in the preliminary part of the specification, the various features of novelty which have been described can be carried out in separate structures. For example, a feeding-belt such as I have shown may be employed in connection with a gin making use of slats in the usual way and having only a single gang of saws, while the particular arrangement of the saws and grooved rollers may be employed with any suitable form of feeding device other than a belt.

While I prefer to make use of four gangs of saws, as explained, it is obvious that a fewer or greater number may be employed, and it will be further evident that the gin may be made in sections, each comprising one or two gangs of saws with a suitable frame therefor, which sections may be secured together to constitute a multiple gin having in its entirety any number of saws desired.

I am aware that it is not new to combine with a single gang of saws a grooved roller for taking the place of the ordinary slats, also that a single brush has been used with two gangs of saws, and also that an inclined feeding-belt has been suggested for use with a roller-gin.

Having now described my invention, what I claim as new therein, and desire to secure by Letters Patent, is as follows:

1. In a multiple cotton-gin, the combination with a plurality of gangs of saws mounted in substantially the same plane, and a device coöperating with each gang of saws and having a series of contracted slots in which the saws work and which prevent the passage of the seeds, of feeding mechanism coöperating with the saws, and forming, with the saws, a continuous ginning-chamber between the saws and feeding mechanism, substantially as and for the purposes set forth.

2. In a multiple cotton-gin, the combination with a plurality of gangs of saws mounted in substantially the same horizontal plane, and a device coöperating with each gang of saws and having a series of contracted slots in which the saws work and which prevent the passage of the seeds, of feeding mechanism coöperating with the saws, and forming, with the saws, a continuous ginning-chamber between the saws and feeding mechanism, substantially as and for the purposes set forth.

3. In a multiple cotton-gin, the combination with a plurality of gangs of saws mounted in substantially the same plane, and a device coöperating with each gang of saws and having a series of contracted slots in which the saws work and which prevent the passage of the seeds, of feeding mechanism coöperating with the saws, forming, with the saws, a continuous ginning-chamber between the saws and feeding mechanism, and means for carrying off from the cotton, during the process of ginning, the seeds and foreign substances, substantially as and for the purposes set forth.

4. In a multiple cotton-gin, the combination with a plurality of gangs of saws mounted in substantially the same plane, and a device coöperating with each gang of saws and having a series of contracted slots in which the saws work and which prevent the passage of the seeds, of a feeding belt or apron coöperating with said saws and mounted in substantially a parallel plane, and forming, with the saws, a continuous ginning-chamber between the saws and said feeding-belt, substantially as and for the purposes set forth.

5. In a multiple cotton-gin, the combination with a plurality of gangs of saws mounted in substantially the same horizontal plane, and a device coöperating with each gang of saws and having a series of contracted slots in which the saws work and which prevent the passage of the seeds, of a feeding belt or apron coöperating with said saws and mounted in substantially a parallel plane, and forming, with the saws, a continuous ginning-chamber between the saws and said feeding-belt, substantially as and for the purposes set forth.

6. In a multiple cotton-gin, the combination with a plurality of gangs of saws mounted in substantially the same horizontal plane, and a device coöperating with each gang of saws and having a series of contracted slots in which the saws work and which prevent the passage of the seeds, of a feeding belt or apron coöperating with said saws and mounted in substantially a parallel plane, and forming, with the saws, a continuous ginning-chamber between the saws and said feeding-belt, and means for removing from the cotton, during the process of ginning, the seeds and foreign substances, substantially as set forth.

7. In a multiple cotton-gin, the combination with a plurality of gangs of saws mounted in substantially the same horizontal plane, of a slatted feeding-belt coöperating with said saws and mounted in a substantially parallel plane, substantially as set forth.

8. In a multiple cotton-gin, the combination of a plurality of gangs of saws, a grooved roller coöperating with each of said gang of saws, and a feeding-apron coöperating with said saws and mounted in substantially a parallel plane therewith, substantially as set forth.

9. In a cotton-gin, the combination with a gang of saws, and a device coöperating with said gang of saws and having a series of contracted slots in which the saws work and which prevent the passage of the seeds, of a feeding-belt for feeding cotton into contact with said saws, and forming, with the saws, a ginning-chamber between the saws and said feeding-belt, a roller coöperating with said feeding-belt and engaging the cotton carried thereby, and means for rotating said roller whereby its periphery will be moved in a direction opposite to that of the belt, substantially as set forth.

10. In a cotton-gin, the combination with a gang of saws, and a device coöperating with said gang of saws and having a series of contracted slots in which the saws work and which prevent the passage of the seeds, of a feeding-belt for feeding cotton into contact with said saws, and forming, with the saws, a ginning-chamber between the saws and said feeding-belt, a spiked roller coöperating with said feeding-belt and engaging the cotton carried thereby, and means for rotating said roller whereby its periphery will be moved in a direction opposite to that of the belt, substantially as set forth.

11. In a cotton-gin, the combination with a gang of saws, and a device coöperating with said gang of saws and having a series of contracted slots in which the saws work and which prevent the passage of the seeds, of a feeding-belt for feeding cotton into contact with said saws, and forming, with the saws, a ginning-chamber between the saws and said feeding-belt, a roller mounted between said saws and said belt coöperating with said belt and engaging the cotton carried thereby, and means for rotating said roller whereby its periphery will be moved in a direction opposite to that of the belt, substantially as set forth.

12. In a cotton-gin, the combination with a gang of saws, and a device coöperating with said gang of saws and having a series of contracted slots in which the saws work and which prevent the passage of the seeds, of a feeding-belt for feeding cotton into contact with said saws, and forming, with the saws, a ginning-chamber between the saws and said feeding-belt, a spiked roller mounted between said saws and said belt coöperating with said belt and engaging the cotton carried thereby, and means for rotating said roller whereby its periphery will be moved in a direction opposite to that of the belt, substantially as set forth.

13. In a multiple cotton-gin, the combination of a plurality of gangs of saws, a grooved roller between said gangs of saws and coöperating with the same, feeding mechanism coöperating with the saws, and forming, with the saws, a continuous ginning-chamber between the saws and feeding mechanism, substantially as set forth.

14. In a multiple cotton-gin, the combination of a plurality of gangs of saws, a brush for expelling the motes from said saws out of the gin, and a second brush expelling motes onto the first-mentioned brush, substantially as set forth.

15. In a multiple cotton-gin, the combination of a plurality of gangs of saws, a brush for expelling the motes from said saws out of the gin, a second brush expelling motes onto the first-mentioned brush, and adjustable plates for said brushes, substantially as set forth.

16. In a multiple cotton-gin, the combination of four gangs of saws, having a ginning-chamber adjacent to the same, a grooved roller coöperating with each gang of saws, two brushes each removing cotton from two gangs of saws, pulleys on the shafts of said saws, rollers and brushes, and two driving-belts at each side of the machine, one for driving two of the grooved rollers and the other for driving two gangs of saws, the said belts passing over the pulleys for driving the brushes and whereby said brushes will be driven from each side of the machine, substantially as set forth.

This specification signed and witnessed this 3d day of May, 1897.

MAGNUS SWENSON.

Witnesses:
A. W. WALBURN,
B. A. JOHNSTON.